W. M. BOENNING.
RESILIENT WHEEL.
APPLICATION FILED JAN. 12, 1916.
1,218,973.
Patented Mar. 13, 1917.
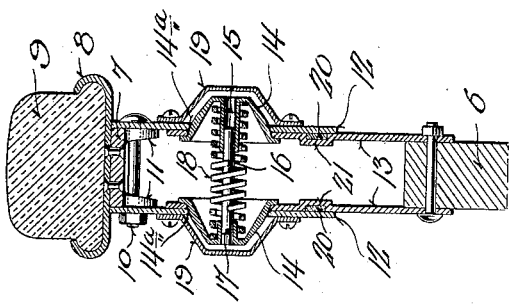
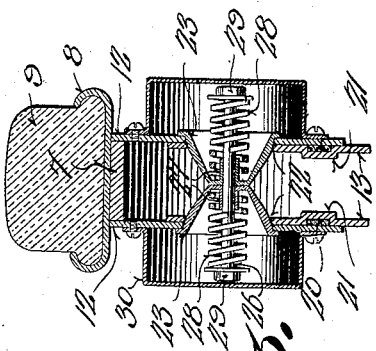
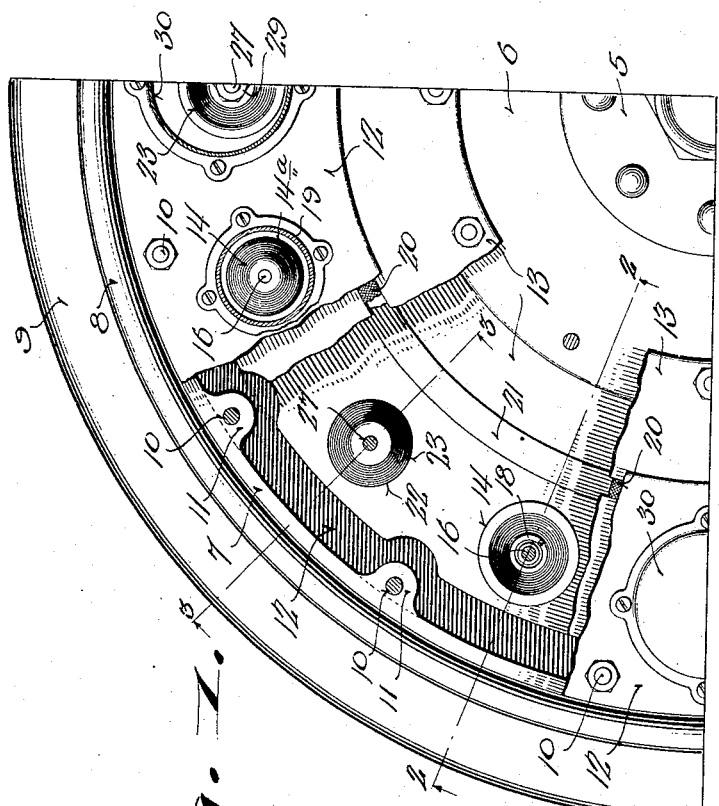

UNITED STATES PATENT OFFICE.

WILLIAM M. BOENNING, OF MANITOWOC, WISCONSIN.

RESILIENT WHEEL.

1,218,973. Specification of Letters Patent. Patented Mar. 13, 1917.

Application filed January 12, 1916. Serial No. 71,611.

*To all whom it may concern:*

Be it known that I, WILLIAM M. BOENNING, a citizen of the United States, and resident of Manitowoc, in the county of Manitowoc and State of Wisconsin, have invented certain new and useful Improvements in Resilient Wheels; and I do hereby declare that the following is a full, clear, and exact description thereof.

The present invention relates more particularly to new and useful improvements in vehicle tires wherein a certain resiliency is to be procured, by other than pneumatic means, although it is to be understood that various features of this present invention may be applicable to other uses in procuring a resilient resistance.

A common difficulty encountered in various types of spring resistance devices and particularly spring vehicles is that a too great freedom of resilient movement is permitted at relatively light loads, and a corresponding excessively great opposition is encountered in heavy loads and it is therefore primarily the object of the present invention to provide a spring resistance device whereby the normally greatly increased resistance of a spring upon approaching its limit of compression is reduced in the resistance imparted through the improved device whereby the spring resistance remains fairly constant in various degrees of movement of parts of the device.

It is further an object of the present invention to provide a spring resistance means associated with the tread and hub portions of a vehicle wheel and comprising a plurality of resistance units so disposed that proper spring resistance is exerted by each of the units irrespective of its position relative to the axis of the wheel whereby all of the elements are operative in any rotative position of the wheel.

A still further object of the invention is to embody the above mentioned spring resistance means in a vehicle wheel in a simple and practical manner, and to provide a structure wherein the various working parts of the wheel are shielded from dust or other foreign matter, and are arranged to operate in an oil bath.

With the above and other objects and advantages in view, the invention resides more particularly in the novel combination, arrangement and formation of parts more particularly hereinafter described and particularly pointed out in the appended claims.

In the drawings:

Figure 1 is a side elevation of a portion of a resilient vehicle wheel, with parts broken away to more clearly disclose the structure thereof, the wheel in this view including two embodiments of spring resistance units arranged alternately about its periphery.

Fig. 2 is a transverse sectional view through a portion of the wheel on the line 2—2 and showing one embodiment of spring resistance unit.

Fig. 3 is a similar view taken on the line 3—3 of Fig. 1 and showing the other embodiment of the invention.

Referring now more particularly to the accompanying drawings, 5 designates the hub portion of a vehicle wheel carrying a circumscribing annular rib 6, and 7 designates a felly to which is secured a tire rim 8 carrying a solid tire member 9 although any tread means could be associated with the felly. Carried at the sides of the felly by means of bolts 10 passed therethrough and through alined pairs of ears 11 projecting inwardly from the felly are annular plates 12 and carried by the sides of the ribs 6 are annular plates 13 which extend between the plates 12 and have sliding contact therewith to permit movement of the felly relative to the hub.

Taking up now the improved type of spring resistance unit illustrated more particularly in Fig. 2, each of the resistance elements comprises a pair of hollow frustoconical shaped cam members 14 which have their bases disposed adjacent each other and which carry at their apex portions inwardly extending sleeves 15 in which is secured a shaft 16, the shaft being preferably secured in one of the sleeves as by the pin 17, and surrounding the shaft and bearing against the apex portions of the members is an expansile coil spring 18, each of the frustoconical members 17 projecting through openings 14ª formed in a respective pair of plates, these openings being in alinement normally when no pressure is exerted on the wheel.

It is thus seen that upon pressure being exerted on the wheel hub a relative sliding movement of the plates 12 and 13 is procured so that the edges of the openings of the plates bear against the frustoconical members with a camming action whereby the resilient action of the spring is imparted to the plates through the frustoconical members, and to provide for a balancing of the tension of the spring whereby it will not become unduly great adjacent the limit of contraction of the spring or be unduly slight adjacent the permitted limit of expansion of the spring, the walls of the frustoconical members are bulged outwardly in a spherical manner to thus provide convex cam faces whereby the inclination adjacent the base is much less than the inclination adjacent the apex portions.

This is an exceedingly important feature of the present invention, as it permits relatively weak springs to efficiently control the resilient movement of the wheel.

It is noted that the shaft 16 holds the frustoconical members in proper alinement with the openings and it is further noted that any excessive twisting action on the shafts by the frustoconical members is prevented in view of the fact that diametrically opposed edge portions of the openings simultaneously exert equal pressure at adjacent portions of the frustoconical members in whichever position the spring suit assumes with respect to the rotative position of the wheel.

Although the edge portions of the openings 18 are shown plain, it will be readily understood that they could be formed to provide a cam bearing of any nature desired.

The annular chamber inclosed by the plates 12 and 13 and the felly and ribs is preferably made fluid tight by means of caps 19 disposed over the openings 18 of the plates 12 and adapted to receive the frustoconical members in their extended position, and by packing rings 20 disposed in annular recesses 21 formed in the outer faces of the plates 13 adjacent the inner edge portions of the plates 12. This chamber forms a well to contain oil for properly lubricating the cone members and the various operative parts of the wheel structure described.

In Fig. 3 a slightly different form of spring unit is shown wherein the plates 12 and 13 are provided with openings 22, exactly similar to the openings 14ª of the structure in Fig. 2 and similar frustoconical members 23 are provided, but are engaged through the openings with their apex portions together, and a shaft 26 is loosely passed through said apex portions and sleeves 25 carried by said portions and is provided on each side of the apex portions with an expansile spring 28 which bears against a head 29 at the adjacent end of the shaft. One of these heads 29 may comprise a nut adjustable on the bolt, and thus means is provided for adjusting the tension of the spring relative to the load carried thereby, should it be desired to procure such adjustment. Caps 30 are disposed on the plates 12 over the openings 22, in the manner similar to the caps 19, but these caps 30 are of relatively greater size to provide for lateral play of the cone members in their movement outwardly of the plates.

Although the spring units embodied in Figs. 2 and 3 are shown alternately arranged in the wheel illustrated in Fig. 1, it is understood that the resilient means of the wheel may comprise an entire series of either type of unit to meet desired conditions.

While these spring units have been shown in connection with a vehicle wheel, it is readily appreciated that certain novel features are inherent therein which may be applied to various spring resistance devices and it is understood that in the application of the present invention I am to be limited only by the scope of the appended claims.

I claim:

1. A spring wheel including a hub portion, a rim portion, a pair of members each connected with a respective portion and provided with an opening adapted to aline with the opening of the other member, said pair of members being held against lateral relative movement, and spring-urged cam members extending into both openings and having cam faces operatively engaging the edges of both openings at diametrically opposite points of the cam surfaces.

2. A spring wheel including a hub portion, a rim portion, a pair of members each connected with a respective portion and provided with an opening adapted to aline with the opening of the other member, said pair of members being held against lateral relative movement, a spring and a member urged by said spring and extending into both openings and having its sides which engage the openings relatively and variably inclined and convex, whereby to exert a cam action on the members variable to correspond to the normal variation of the spring resistance.

In testimony that I claim the foregoing I have hereunto set my hand at Manitowoc, in the county of Manitowoc and State of Wisconsin, in the presence of two witnesses.

WILLIAM M. BOENNING.

Witnesses:
JULIUS LINDSTEDT,
FRANK HOFFMAN.

Copies of this patent may be obtained for five cents each, by addressing the "Commissioner of Patents, Washington, D. C."